United States Patent [19]

Sanada

[11] Patent Number: 5,379,169
[45] Date of Patent: Jan. 3, 1995

[54] MAGNETIC DISK DRIVE SPINDLE MOTOR HAVING PLATES TO SHIELD THE MOTOR ENCLOSED SPACE FROM THE OUSTSIDE

[75] Inventor: Yotaro Sanada, Tokyo, Japan
[73] Assignee: NEC Corporation, Tokyo, Japan
[21] Appl. No.: 117,622
[22] Filed: Sep. 8, 1993

[30] Foreign Application Priority Data

Sep. 8, 1992 [JP] Japan .................................. 4-239335
Jun. 21, 1993 [JP] Japan .................................. 5-148743

[51] Int. Cl.$^6$ ............................................. G11B 17/02
[52] U.S. Cl. .................................................. 360/99.08
[58] Field of Search ............... 360/98.07, 99.04, 99.08; 384/134–135

[56] References Cited

U.S. PATENT DOCUMENTS 4,835,637  5/1989  Mach et al. .
5,177,650  1/1993  Jabbari ............................ 360/99.08

FOREIGN PATENT DOCUMENTS 63-211167  9/1988  Japan .
63-317977 12/1988  Japan .
 3-41693  2/1991  Japan .

Primary Examiner—A. J. Heinz
Attorney, Agent, or Firm—Sughrue, Mion, Zinn, Macpeak & Seas

[57] ABSTRACT

A magnetic disk drive spindle motor includes a cylindrical spindle hub, a pair of cylindrical bearings, cylindrical bearing holders, a shaft, a housing, and dynamic pressure generating plates. The spindle hub stacks and supports an information storage medium in an axial direction and incorporates a first member constituting a rotary drive system. The bearings rotatably hold two ends of the spindle hub by outer rings. The bearing holders hold the outer rings of the bearings and rotate together with the spindle hub. The shaft holds inner rings of the bearings and fixes a second member constituting a rotary drive system so as to oppose the first member. The housing fixes and supports one end of the shaft. The dynamic pressure generating plates are formed in a disk-like form having a predetermined thickness and fixed on the shaft outside the bearings to oppose inner side surfaces of the bearings with small gaps, and generate dynamic pressures in the gaps between the dynamic pressure generating plates and the inner side surfaces of the bearings, thereby shielding the internal space of the motor from the outside.

9 Claims, 4 Drawing Sheets

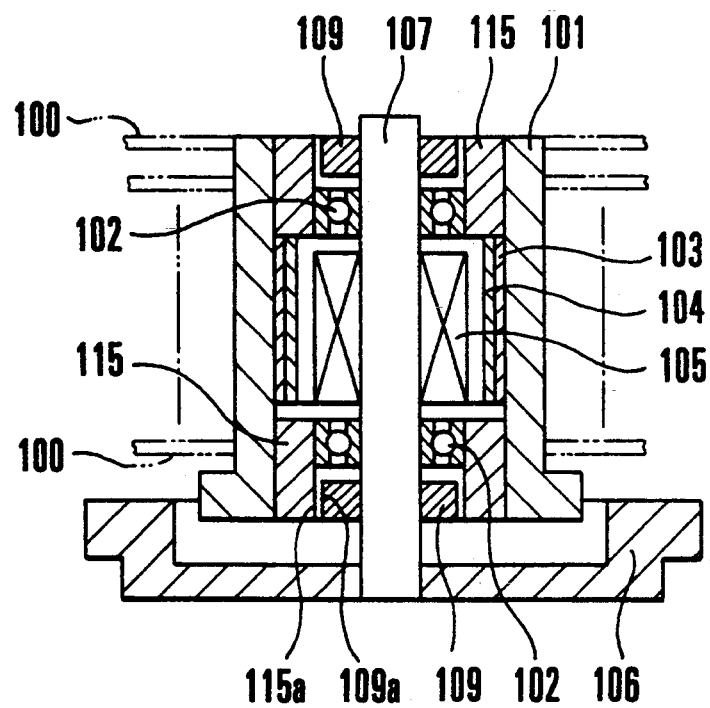
F I G. 1
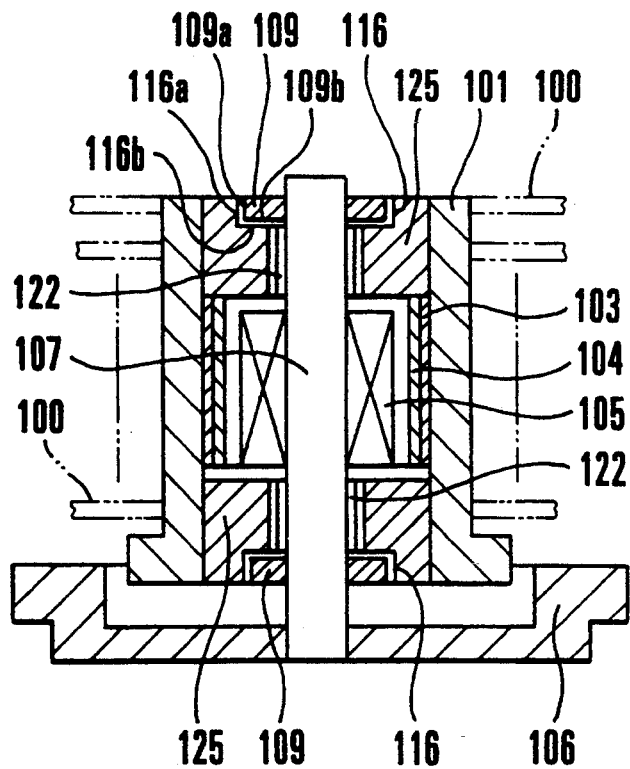
F I G. 2

MAGNETIC DISK DRIVE SPINDLE MOTOR HAVING PLATES TO SHIELD THE MOTOR ENCLOSED SPACE FROM THE OUSTSIDE

BACKGROUND OF THE INVENTION

The present invention relates to a magnetic disk drive spindle motor and, more particularly, to a magnetic disk drive spindle motor structure for shielding the internal space of a motor from the outside.

In a magnetic disk drive spindle motor of this type, generally, dust such as a grease oil leaking from a motor or bearing scatters outside the motor and adheres to a magnetic storage medium to cause a serious accident such as a head crash. In order to solve this problem, conventionally, a magnetic disk drive spindle motor having a structure in which a magnetic fluid seal shields the internal space of the motor from the outside is used.

FIG. 7 shows a conventional magnetic disk drive spindle motor having the above-described structure. Referring to FIG. 7, reference numeral 1 denotes a spindle hub for stacking and supporting an information storage medium (not shown) outside. A permanent magnet 4 and a yoke 3 are fitted inside the spindle hub 1 to constitute a rotary drive system.

A pair of upper and lower rolling bearings 2 rotatably support the spindle hub 1 by the outer rings. A shaft 7 supports the inner rings of the rolling bearings 2 and fixes a coil 5 to oppose the permanent magnet 4 and the yoke 3, both of which are mounted on the spindle hub 1. A housing 6 fixes and supports one end of the shaft 7. A pair of bearing holders 15 hold the outer rings of the rolling bearings 2 and rotate together with the spindle hub 1. A pair of magnetic fluid seals 16 are provided to the bearing holders 15.

Each magnetic seal 16 is constituted by mounting a pair of magnetized doughnut-like disks onto the bearing holder 15 of the spindle hub 1 side with a small gap therebetween and injecting a magnetic fluid into the gap. The gap between the inner circumference of the disk and the shaft 7 is set at, e.g., 0.05 mm, and the gap is filled with the viscous magnetic fluid. The internal space of the spindle motor is stably shielded from the external space during the rotation and stop of the spindle hub.

In the above-described conventional magnetic disk drive spindle motor, the magnetic fluid seal 16 is very stable during the rotation and stop of the spindle hub 1 so that it effectively shields the internal space of the motor from the outside. When a load on the rotary body is, however, increased, a large load torque is required, because a resistance is generated by the magnetic fluid between the shaft 7 and the rotary body constituted by the spindle hub 1 or the like. Particularly, in a recent magnetic disk drive, operations at a higher speed are required, and the rated speed of the motor needs to be increased. The load caused by the magnetic fluid seal is greatly increased in proportion to the rotational speed of the motor.

In addition, the magnetic fluid scattered due to the pressure difference between the internal and external spaces of the motor causes an accident such as a head crash in the magnetic disk drive to degrade reliability. More specifically, the spindle hub 1 must be rotated at a high speed of several thousands rpm because such a magnetic disk drive spindle motor write/read-accesses the magnetic disk at a high speed. When a rated current is continuously supplied to the coil 5 to rotate the spindle motor at high speed, heat is generated in the coil 5 to expand the air inside the motor. When the internal pressure is increased, and the pressure difference between the inside and the outside exceeds the pressure limit, the magnetic fluid scatters to cause a head crash or the like.

An improved structure using the magnetic fluid seal is proposed in Japanese Patent Laid-Open No. 3-41693 in which an air path is formed at the upper portion of the shaft to couple the internal space of the motor with the external space, and a pressure regulating member is provided in the air path to adjust the pressure between the internal and external spaces. In this structure, however, the most advanced high-precision machining technique is required to form the air path inside the shaft, and number of machining steps undesirably increases. In addition, the air path formed inside the shaft impairs rigidity of the shaft to degrade stability of the shaft during the high-speed rotation.

On the other hand, a structure using no magnetic fluid seal is proposed in Japanese Patent Laid-Open No. 63-317977 in which a high-speed airflow is generated in a gap between a shielded bearing and a washer to shield the internal space of a motor from the outside. Another structure is illustrated in FIG. 2 of Japanese Patent Laid-Open No. 63-211167 in which a labyrinth mechanism is formed between the lower surface of a spindle hub and the upper surface of a housing.

In the former structure, however, the cost of the motor is increased because a specific member such as the shielded bearing is used. There is also a problem of reliability caused by a deterioration of the shield. On the other hand, in the latter structure, highly precise three-dimensional patterns are formed on the spindle hub and the housing. As in the above-described case, the most advanced high-precision machining technique is required, and an increase in number of steps causes an increase in manufacturing cost.

SUMMARY OF THE INVENTION

It is an object of the present invention to provide a magnetic disk drive spindle motor capable of shielding the internal space of the motor from the outside by a simple and low-cost structure.

It is another object of the present invention to provide a magnetic disk drive spindle motor which reliably shields the internal space of the motor from the outside during the rotation and stop, thereby preventing dust from being scattered from the hub.

It is still another object of the present invention to provide a magnetics disk drive spindle motor capable of improving reliability of a magnetic disk drive.

It is yet another object of the present invention to provide a magnetic disk drive spindle motor using no magnetic fluid seal to reduce a motor load.

In order to achieve the above objects of the present invention, there is provided a magnetic disk drive spindle motor comprising a cylindrical spindle hub for stacking and supporting an information storage medium in an axial direction and incorporating a first member constituting a rotary drive system, a pair of cylindrical bearings for rotatably holding two ends of the spindle hub by outer rings, cylindrical bearing holders, rotating together with the spindle hub, for holding the outer rings of the bearings, a shaft for holding inner rings of the bearings and fixing a second member constituting a rotary drive system so as to oppose the first member, a housing for fixing and supporting one end of the shaft, and dynamic pressure generating means, formed in a disk-like form to have a predetermined thickness and fixed on the shaft outside the bearings to oppose inner side surfaces of the bearings with small gaps, for generating dynamic pressures in the gaps between the dynamic pressure generating means and the inner side surfaces of the bearings, thereby shielding the internal space of the motor from the outside.

BRIEF DESCRIPTION OF THE DRAWINGS

FIG. 1 is a longitudinal sectional view showing a rotating shaft Of a magnetic disk drive spindle motor according to the first embodiment of the present invention;

FIG. 2 is a longitudinal sectional view showing a rotating shaft of a magnetic disk drive spindle motor according to the second embodiment of the present invention;

DESCRIPTION OF THE PREFERRED EMBODIMENTS

Figure 3:
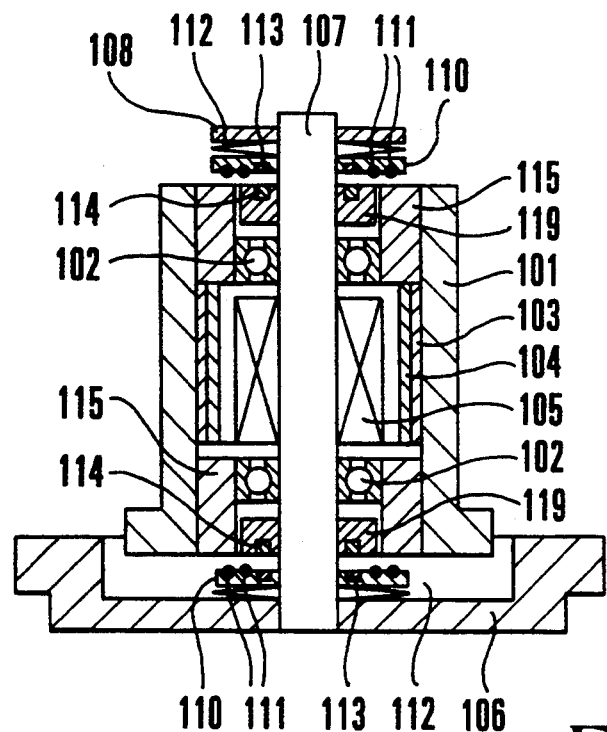
FIG. 3 is a longitudinal sectional view showing a rotating shaft of a magnetic disk drive spindle motor according to the third embodiment of the present invention.

The present invention will be described below with reference to the accompanying drawings. FIG. 1 shows a magnetic disk drive spindle motor according to the first embodiment of the present invention.

Referring to FIG. 1, reference numeral 101 denotes a cylindrical spindle hub for axially stacking and supporting an information storage medium 100 on the outer circumferential surface. A permanent magnet 104 and a yoke 103 are fitted in the internal central portion of the spindle hub 101 to constitute a rotary drive system.

A pair of upper and lower rolling bearings 102 rotatably hold the two ends of the spindle hub 101 by the outer rings. A shaft 107 holds the inner rings of the rolling bearings 102 and fixes a coil 105 constituting a motor drive system so as to oppose the permanent magnet 104 and the yoke 103. A housing 106 fixes and supports one end of the shaft 107. A pair of cylindrical bearing holders 115 hold the outer rings of the rolling bearings 102 and rotate together with the spindle hub 101.

A disk-like dynamic pressure generating plate 109 serving as a dynamic pressure generating means is fixed on the shaft 107 outside each bearing 102 to oppose an inner circumferential surface 115a of each bearing holder 115 which does not hold the rolling bearing 102. An outer circumferential surface 109a of the dynamic pressure generating plate 109 opposes the inner circumferential surface 115a of the bearing holder 115 with a small gap of, e.g., several μm in the radial direction of the shaft 107. The dynamic pressure generating plate 109 has a predetermined thickness, e.g., a thickness equivalent to the diameter of the shaft 107, to increase the dynamic pressure in the gap and obtain a good dust-proof effect even during the stop of the motor.

Assuming that the spindle hub 101 is rotated at a high speed by the rotary drive system, the bearing holders 115 integrally fixed on the spindle hub 101 are also rotated at a high speed. At this time, a high-speed airflow, i.e., a dynamic pressure is generated in the small gap between the outer circumferential surface 109a of the dynamic pressure generating plate 109 fixed on the shaft 107 and the inner circumferential surface 115a of the bearing holder 115. For this reason, the internal space of the motor is shielded from the outside, thereby preventing dust from being scattered from the motor or bearing 102.

In general, if the gap between the outer circumferential surface 109a of the dynamic pressure generating plate 109 and the inner circumferential surface 115a of the bearing holder 115 is set to be several μm, an enhanced dynamic pressure effect can be expected. However, a gap of 10 to 20 μm is also enough to effectively shield the internal space of the magnetic disk drive spindle motor from the outside.

In FIG. 1, as two surfaces opposing each other with a small gap to generate the dynamic pressure, a structure in which the outer circumferential surface 109a of the dynamic pressure generating plate 109 opposes the inner circumferential surface 115a of the bearing holder 115 in the radial direction of the shaft 107 has been exemplified. However, the same effect can be obtained when a spindle motor structure, e.g., a stepped bearing holder structure, is used, in which the upper and lower surfaces of a pair of dynamic pressure generating plates 109 respectively oppose the upper and lower surfaces constituting step portions of a pair of bearing holders 115.

FIG. 2 shows a magnetic disk drive spindle motor according the second embodiment of the present invention. The same reference numerals as in FIG. 1 denote the same parts in FIG. 2. The spindle motor of this embodiment is characterized by a dynamic pressure generating portion formed in both the radial and axial directions of a shaft 107.

Round recessed portions 116a for housing disk-like dynamic pressure generating plates 109 having a predetermined thickness are formed in the upper and lower surfaces of bearing holders 125, respectively. An outer circumferential surface 109a of each dynamic pressure generating plate 109 opposes an inner circumferential surface 116a of the corresponding recessed portion 116 with a small gap. In addition, one side surface 109b of each dynamic pressure generating plate 109 opposes a bottom surface 116b of the corresponding recessed portion 116 with a small gap. As a spindle hub 101 is rotated at a high speed, a dynamic pressure is generated between the surfaces opposing each other in the radial and axial directions of the shaft 107. A pair of upper and lower fluid bearings 122 rotatably hold the spindle hub 101 by the outer rings through the bearing holders 125. The outer ring diameter of the fluid bearing 122 is smaller than that of the rolling bearing 102 of FIG. 1 to make it possible to provide the bearing holder structure having the recessed portion 116.

A very high dynamic pressure is generated between the outer circumferential surface 109a and the side surface 109b of each dynamic pressure generating plate 109 and their opposing surfaces, i.e., the inner circumferential surface 116a and the bottom surface 116b of the corresponding recessed portion 116. Therefore, the internal space of the spindle hub 101 is reliably and effectively shielded from the outside. In addition, since the two dynamic pressure generating portions are provided in the radial and axial directions of the shaft 107, stability against vibrations in the both directions is improved. In this case, the dynamic pressure generating plate 109 can be thinner than that of the embodiment of FIG. 1 because the dynamic pressure can also be obtained on the side surface of each dynamic pressure generating plate.

FIG. 3 shows a magnetic disk drive spindle motor according to the third embodiment of the present invention, The same reference numerals as in FIG. 1 denote the same parts in FIG. 3. The spindle motor of this embodiment is characterized by a shielding means for preventing dust from being scattering during the stop of a spindle hub.

In general, a disk drive connected to a large computer or the like is always continuously rotated. For this reason, as in the embodiments of FIGS. 1 and 2, a spindle motor which shields its internal space from the outside by a dynamic pressure generated only during the rotation of the spindle hub is satisfactorily used. A disk drive connected to a personal computer or the like, however, repeats rotation and stop. A spindle motor used in such a disk drive need to also be shielded during the stop of the spindle hub.

Referring to FIG. 3, a disk-like seal plate 110 serving as a shielding means has a larger diameter than that of the inner circumference of a bearing holder 115. The seal plate 110 seals a gap between the outer circumferential surface! of each dynamic pressure generating plate 119 and the inner circumferential surface of the corresponding bearing holder 115 during the stop of the spindle hub. Two types of 0-rings 111 having large- and small-diameters consist of an elastic material such as rubber, and are mounted on each seal plate 110. The gap between the outer circumferential surface of each dynamic pressure generating plate 119 and the inner circumferential surface of the corresponding bearing holder 115 is located between the corresponding two 0-rings 111. Belleville springs 112 are supported by seal plate holders 108 and generate biasing forces to press the seal plates 110 in opposite directions toward the dynamic pressure generating plates 119, respectively. Ring-like magnets 113 are respectively fixed to the seal, plates 110, and generate repulsive forces against the biasing forces of the belleville springs 112 during the rotation of the spindle hub 101.

Electromagnets 114 are mounted on the dynamic pressure generating plates 119 at positions opposing the repulsive force generation magnets 113 provided to the seal plates 110, respectively. During the rotation of the spindle hub 101, the electromagnets 114 are energized to generate magnetic forces against the biasing forces of the belleville springs 112 between the electromagnets 114 and the magnets 113 of the seal plates 110, respectively, Each seal plate 110 is kept away from the corresponding dynamic pressure generating plate 119. On the other hand, during the stop of the spindle hub 101, the electromagnets 114 are not energized so that the seal plates 110 are brought into tight contact with the dynamic pressure generating plates 119 by the biasing forces of the belleville springs 112, respectively. The small gap between the outer circumferential surface of each dynamic pressure generating plate 119 and the inner circumferential surface of the corresponding bearing holder 115 is sealed up by the corresponding 0-rings 111.

Figure 4:
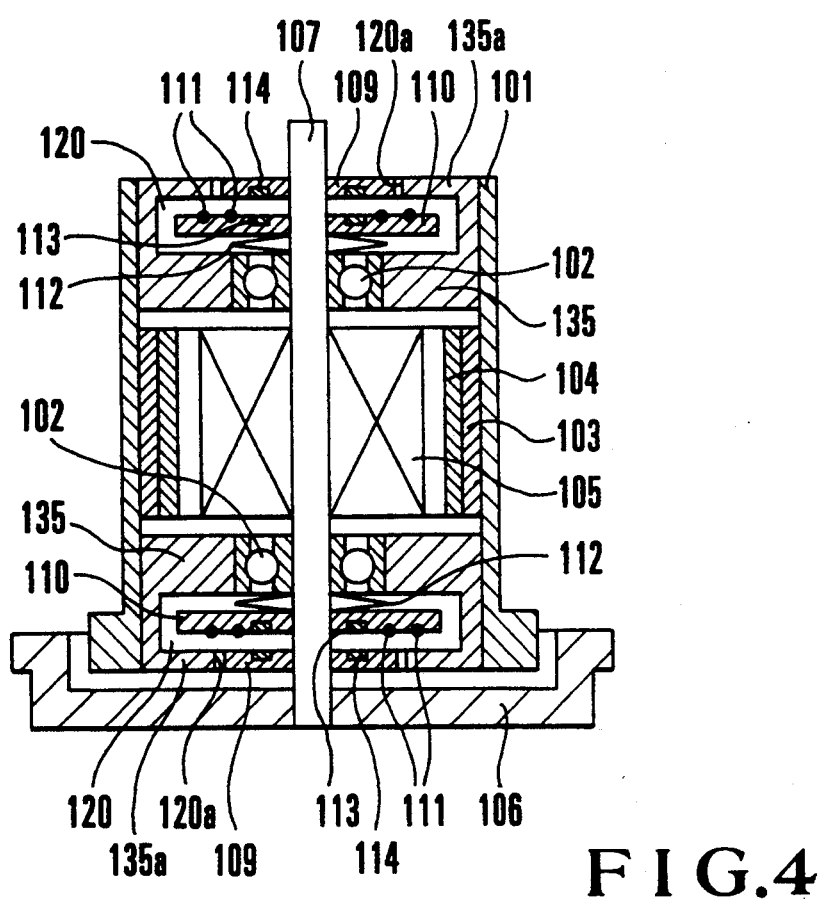
FIG. 4 is a longitudinal sectional view showing a rotating shaft of a magnetic disk drive spindle motor according to the fourth embodiment of the present invention.
Figure 5:
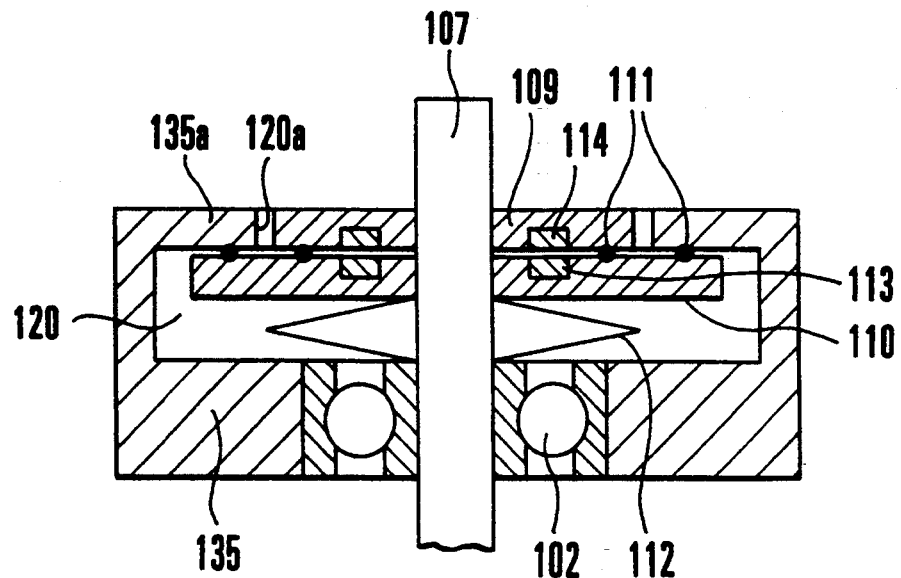
FIG. 5 is an enlarged sectional view showing the main part of the operation position of a seal plate during the stop of the spindle motor in FIG. 4.
Figure 6:
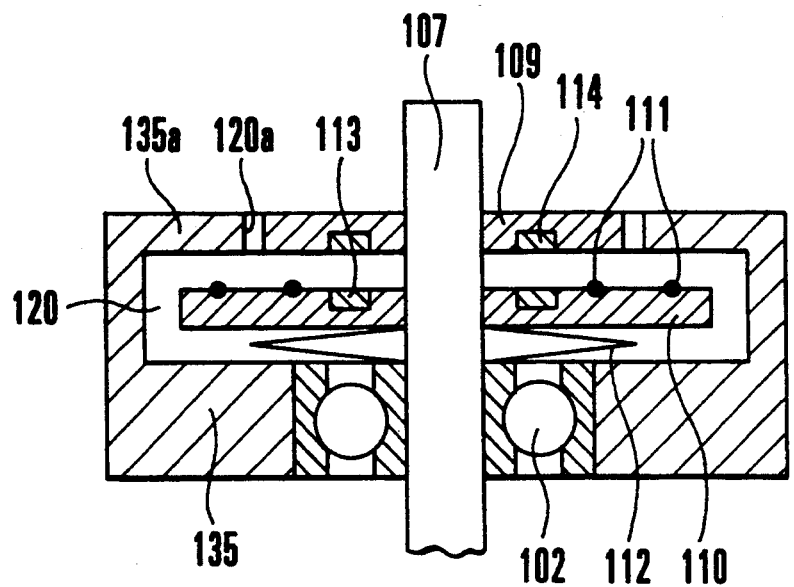
FIG. 6 is an enlarged sectional view showing the main part of the operation position of the seal plate during the rotation of the spindle motor in FIG. 4.
Figure 7:
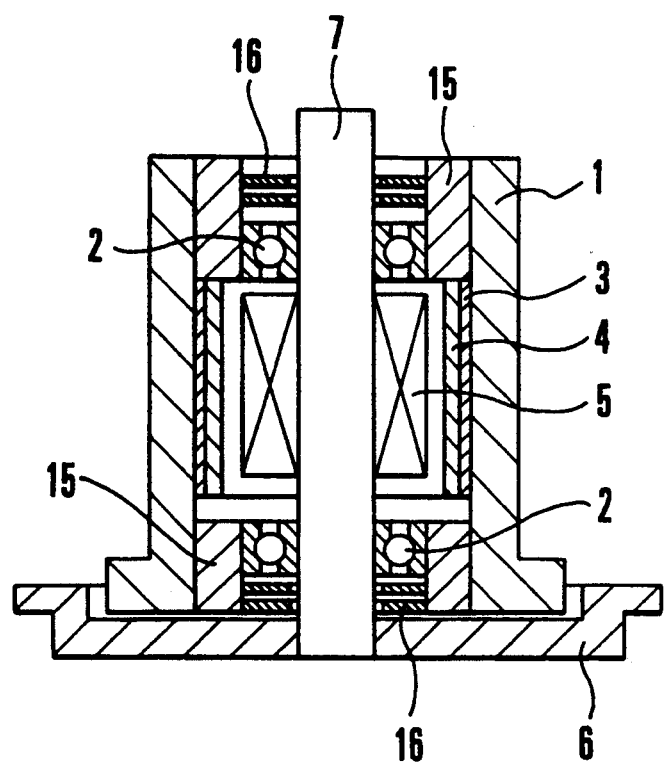
FIG. 7 is a longitudinal sectional view showing a rotating shaft of a conventional magnetic disk drive spindle motor.

FIG. 4 shows a magnetic disk drive spindle motor according to the fourth embodiment of the present invention. FIGS. 5 and 6 respectively show the positions of seal plates during the stop and rotation of a spindle hub. The same reference numerals as in FIG. 1 denote the same parts in FIGS. 4 to 6. The spindle motor of this embodiment is characterized by a structure in which seal plates 110 are provided inside dynamic pressure generating plates 109, respectively, and a gap between the outer circumferential surface of each dynamic pressure generating plate 109 and the inner circumferential surface of a corresponding bearing holder 135 is sealed up from the inside of the motor.

Referring to FIG. 4, chambers 120 for housing the seal plates 110 are formed between bearings 102 of the bearing holders 135 and the dynamic pressure generating plates 109, respectively. Windows 120a are formed in roofs 135a of the chambers 120, respectively. A dynamic pressure is generated in a gap between the outer circumferential surface of each dynamic pressure generating plate 109 and the inner circumferential surface of the corresponding window 120a in accordance with the rotation of a spindle hub 101, thereby shielding the internal space of the motor from the outside. Belleville springs 112 are interposed between the bearings 102 and the seal plates 110, respectively. The seal plates 110 are biased by the belleville springs 112 in opposite direction to be away from the bearing holders 102, respectively. Two types of 0-rings 111 and a magnet 113 are arranged in the biasing direction, i.e., on the outer surface of each seal plate 110. Electromagnets 114 are arranged on the inner surfaces of the dynamic pressure generating plates 109 in correspondence with the magnets 113, respectively.

During the stop of the spindle hub 101, the electromagnets 114 are not energized so that the seal plates 110 are moved upward and downward by the biasing forces of the belleville springs 112, respectively, as shown in FIG. 5. The small gap between the outer circumferential surface of each dynamic pressure generating plate 109 and the inner circumferential surface of the corresponding bearing holder 135 is sealed up by the corresponding 0-rings 111 mounted on the surface opposing to this dynamic pressure generating plate 109.

During the rotation of the spindle hub 101, the electromagnets 114 are energized so that repulsive forces larger than the biasing forces of the belleville springs 112 are generated between the electromagnets 114 and the magnets 113 fixed to the seal plates 110, respectively. As shown in FIG. 6, the seal plates 110 are kept away from the dynamic pressure generating plates 109 to be moved downward and upward in the directions toward the bearings 102, respectively. At the same time, in accordance with the rotation of the spindle hub 101, a dynamic pressure is generated in the gap between the outer circumferential surface of each dynamic pressure generating plate 109 and the inner circumferential surface of the corresponding bearing holder 135 to shield the internal space of the motor from the external space.

Even during the stop of the spindle hub 101, the internal space of the motor is shielded from the outside by the seal plates 110. The dust such as a grease oil is completely prevented from being scattered from the motor or bearing 102. An effective magnetic disk drive spindle motor which repeats rotation and stop can be obtained.

In this embodiment, the seal plates 110 are provided inside the bearing holders 135 to make it possible to support the belleville springs 112 on the inner-ring side surfaces of the bearings 102, respectively. For this reason, the seal plate holders 108 of FIG. 3 can be eliminated. In addition, the upper space of the motor becomes flat to realize a low-profile motor.

In each embodiment described above, the dynamic pressure generating portion is constituted by the dynamic pressure generating plate 109 and the bearing holders 115, 125, or 135. However, instead of the bearing holders 115, 125, or 135, the side surface of the outer ring of the spindle hub 101 or bearings 102 and 122 may be used to obtain the same effect as the above embodiments.

As has been described above, according to the present invention, the dynamic pressure generating plate is fixed to the shaft. During the rotation of the spindle hub, a dynamic pressure is generated between the rotating spindle hub and each fixed dynamic pressure generating plate to shield the internal space of the motor from the outside. The dust such as a grease oil is prevented from being scattered from the motor or bearing. Therefore, an accident caused by scattering of the magnetic fluid in use of the magnetic fluid seal can be completely avoided. This effect is more remarkable during high-speed rotation.

During the stop of the spindle hub, the small gap of each dynamic pressure generating portion is sealed up by the corresponding seal plate. During the rotation and stop of the spindle hub, the internal space of the motor is reliably shielded from the outside to prevent the dust such as a grease oil from being scattered from the motor or bearing.

In the magnetic disk drive spindle motor, the internal space of the motor can be reliably shielded from the outside to completely prevent the dust from being scattered from the motor during the rotation and stop of the spindle hub. The occurrence of a head crash caused by the dust on the magnetic storage medium can be minimized, and reliability of the magnetic disk drive can be greatly improved.

What is claimed is:

1. A magnetic disk drive spindle motor comprising:
a cylindrical spindle hub for stacking and supporting an information storage medium on an axial direction and incorporating a first member constituting a rotary drive system;
a pair of cylindrical bearings for rotatably holding two ends of said Spindle hub by outer rings;
cylindrical bearing holders, rotating together with said spindle hub, for holding said outer rings of said bearings;
a shaft for holding inner rings of said bearings and fixing a second member constituting a rotary drive system so as to oppose said first member;
a housing for fixing and Supporting one end of said shaft, said housing and said spindle hub generally defining an inner space of said spindle motor;
dynamic pressure generating means, formed in a disk-like form to have predetermined thickness and fixed on said shaft outside said bearings to oppose inner side surfaces of said bearings with small gaps, for generating dynamic pressures in said gaps between said dynamic pressure generating means and said inner side surfaces of said bearings, thereby shielding the internal space of said motor from the environment; and
shielding means for shielding said gaps between said dynamic pressure generating means and said inner side surfaces of said bearing holders while being in tight contact with said dynamic pressure generating means, and drive means for keeping said shielding means away from said dynamic pressure generating means during the rotation of said spindle hub and bringing said shielding means in tight contact with said dynamic pressure generating means whenever said spindle hub is not rotated.

2. An apparatus according to claim 1, wherein said dynamic pressure generating means are arranged such that outer circumferential surfaces thereof oppose inner circumferential surfaces for holding said outer rings of said bearings with small gaps therebetween, and generate the dynamic pressures in said gaps between said outer circumferential surfaces of said dynamic pressure generating means and said inner circumferential surfaces of said bearings in the axial direction of said shaft.

3. An apparatus according to claim 1, wherein said inner circumferential surfaces of said bearing holders, for holding said outer rings of said bearings, comprises stepped portions in the axial direction of said shaft, and said dynamic pressure generating means are arranged such that side surfaces thereof oppose stepped surfaces of said bearing holders with small gaps therebetween, and generate the dynamic pressures in said gaps between said side surfaces of said dynamic pressure generating means and said stepped surfaces of said bearing holders in a radial direction of said shaft.

4. An apparatus according to claim 1, wherein said inner circumferential surfaces of said bearing holders, for holding said outer rings of said bearings, comprise stepped portions in the axial direction of said shaft, and said dynamic pressure generating means are arranged such that outer circumferential surfaces thereof oppose said inner circumferential surfaces of said stepped portions of said bearings with small gaps therebetween while side surfaces of said dynamic pressure generating means oppose said stepped surfaces of said bearing holders with small gaps therebetween, and generate the dynamic pressures in said gaps between said outer circumferential surfaces of said dynamic pressure generating means and said inner circumferential surfaces of said stepped portions of said bearings in the axial direction of said shaft, and in said gaps between said side surfaces of said dynamic pressure generating means and said stepped surfaces of said bearings in the radial direction of said shaft, respectively.

5. An apparatus according to claim 1, wherein said bearing holders comprise chambers for housing said shielding means, formed outside said bearings and having round windows formed in roofs thereof, said windows opposing said dynamic pressure generating means with small gaps, generate the dynamic pressures in said gaps between said outer circumferential surfaces of said dynamic pressure generating means and said inner circumferential surfaces of said windows during the rotation of said spindle hub, and shield said gaps between said outer circumferential surfaces of said dynamic pressure generating means and said inner circumferential surfaces of said windows from an inside of the motor by said shielding means during the stop of said spindle hub.

6. An apparatus according to claim 1, wherein said drive means comprise biasing means for continually biasing said shielding means in directions to be moved close to said dynamic pressure generating means, and counterbiasing means for keeping said shielding means away from said dynamic pressure generating means against said biasing means during the rotation of said spindle hub.

7. An apparatus according to claim 6, wherein said biasing means comprise belleville springs, and said counterbiasing means comprise permanent magnets each provided to one opposing surface of each of said dynamic pressure generating means and said shielding means, and electromagnets each provided to other opposing surface of each of said dynamic pressure generating means and said shielding means so as to oppose a corresponding one of said permanent magnets, for generating a repulsive force larger than the biasing force of a corresponding one of said belleville springs between said each electromagnet and said corresponding permanent magnet upon energization.

8. An apparatus according to claim 1, wherein said shielding means comprise seal members for sealing said gaps between said dynamic pressure generating means and said inner side surfaces of said bearing holders while said shielding means are in tight contact with said dynamic pressure generating means.

9. An apparatus according to claim 8, wherein each of said seal members comprises two types of O-ring-like elastic members respectively having smaller and larger diameters than a diameter of said gaps between said dynamic pressure generating means and said inner side surfaces of said bearing holders.

* * * * *